United States Patent
Denham et al.

(10) Patent No.: US 12,354,777 B2
(45) Date of Patent: Jul. 8, 2025

(54) INTEGRATED ELECTRO-MAGNETICALLY PRELOADED KINEMATIC JOINT FOR ON-ORBIT ASSEMBLY OF MODULAR SPACE VEHICLES

(71) Applicant: The Aerospace Corporation, El Segundo, CA (US)

(72) Inventors: Donald Wayne Denham, Redondo Beach, CA (US); Timothy P. Woodard, League City, TX (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 700 days.

(21) Appl. No.: 17/492,887

(22) Filed: Oct. 4, 2021

(65) Prior Publication Data
US 2023/0108618 A1   Apr. 6, 2023

(51) Int. Cl.
H01F 7/02 (2006.01)
B64G 1/64 (2006.01)
H01F 7/20 (2006.01)

(52) U.S. Cl.
CPC .......... *H01F 7/0231* (2013.01); *B64G 1/642* (2023.08); *H01F 7/021* (2013.01); *H01F 7/0242* (2013.01); *H01F 7/206* (2013.01); *H01F 2007/208* (2013.01)

(58) Field of Classification Search
CPC .............. B46G 1/641–1/644; H01F 7/0242
See application file for complete search history.

(56) References Cited

U.S. PATENT DOCUMENTS

| | | | |
|---|---|---|---|
| 11,878,816 B2 * | 1/2024 | Weintraub | B64G 1/1078 |
| 2019/0023419 A1 * | 1/2019 | Helvajian | B64G 1/10 |
| 2019/0341721 A1 * | 11/2019 | Goff | H01F 7/0205 |
| 2019/0385772 A1 | 12/2019 | Denham | |
| 2019/0385774 A1 | 12/2019 | Denham et al. | |
| 2022/0242596 A1 * | 8/2022 | Harleman, Jr. | B64G 1/641 |

* cited by examiner

*Primary Examiner* — Bernard Rojas
(74) *Attorney, Agent, or Firm* — LeonardPatel PC

(57) ABSTRACT

A payload-bus kinematic interface system includes one or more kinematic devices. Each kinematic device includes a first contacting surface and a second contacting surface. The first contacting surface kinematically interfaces with the second contacting surface, passing loads or forces to the second contacting surface.

20 Claims, 15 Drawing Sheets

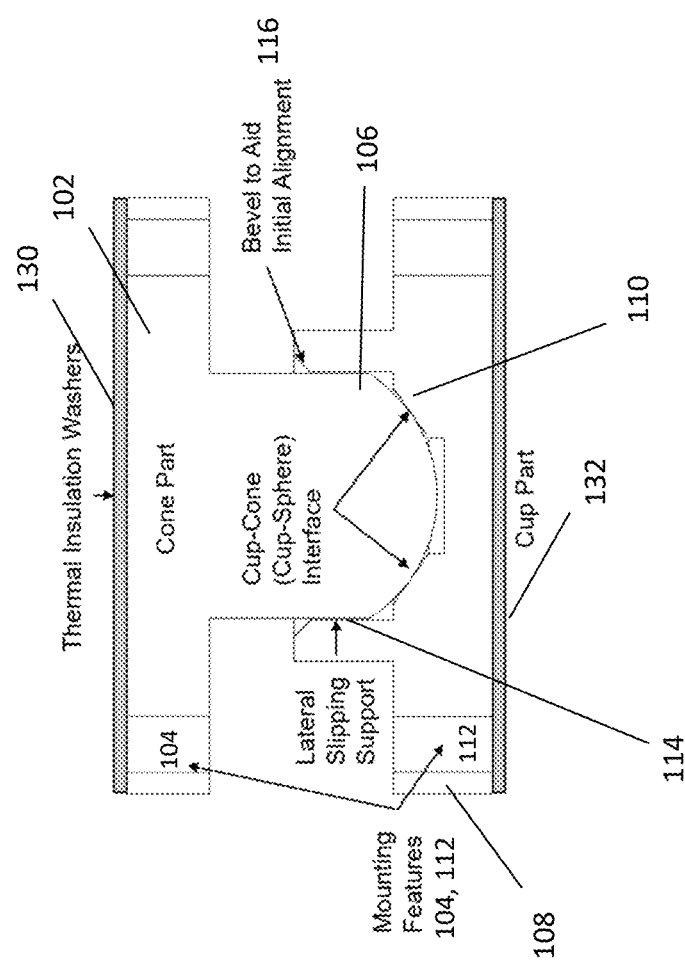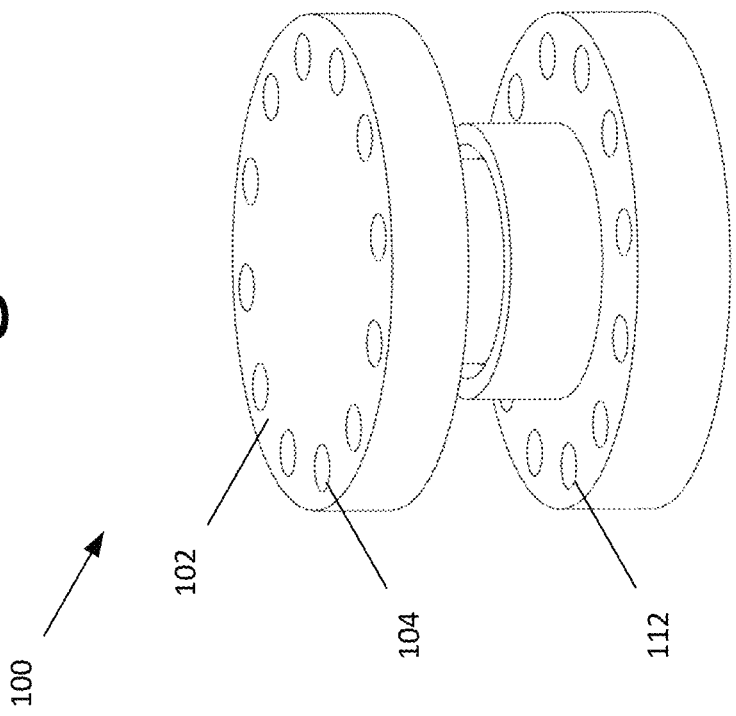

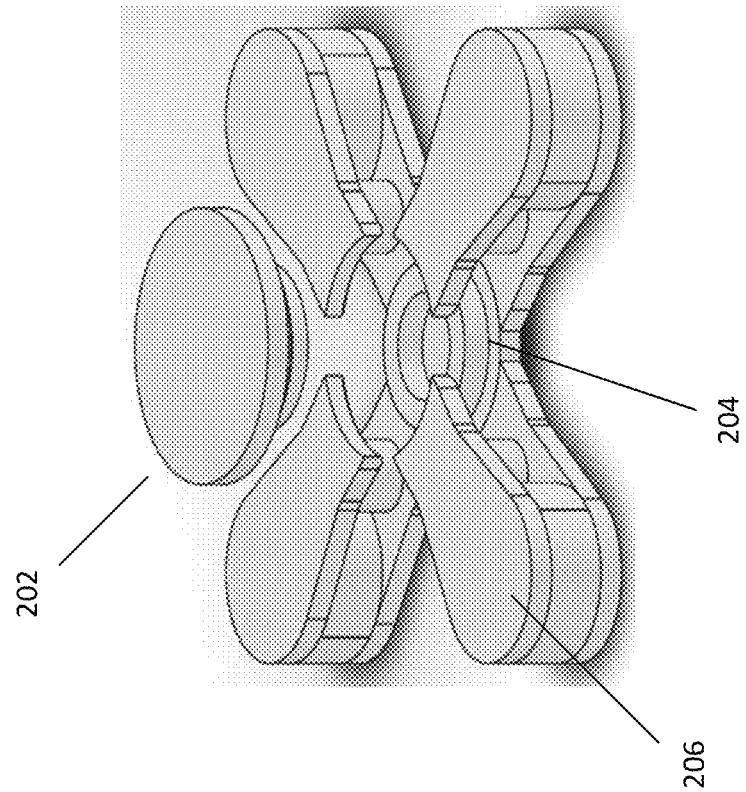
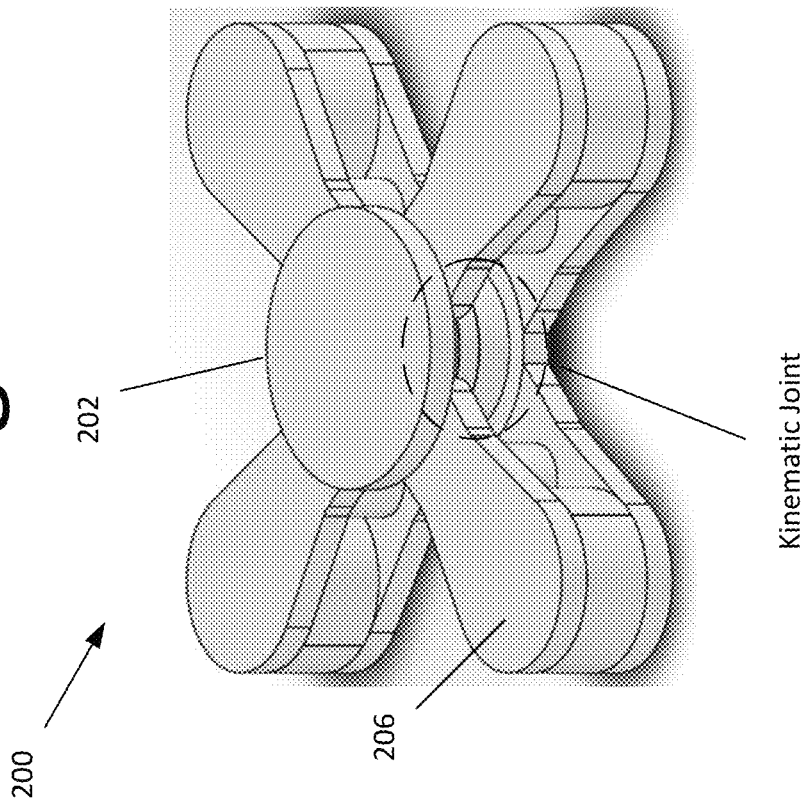

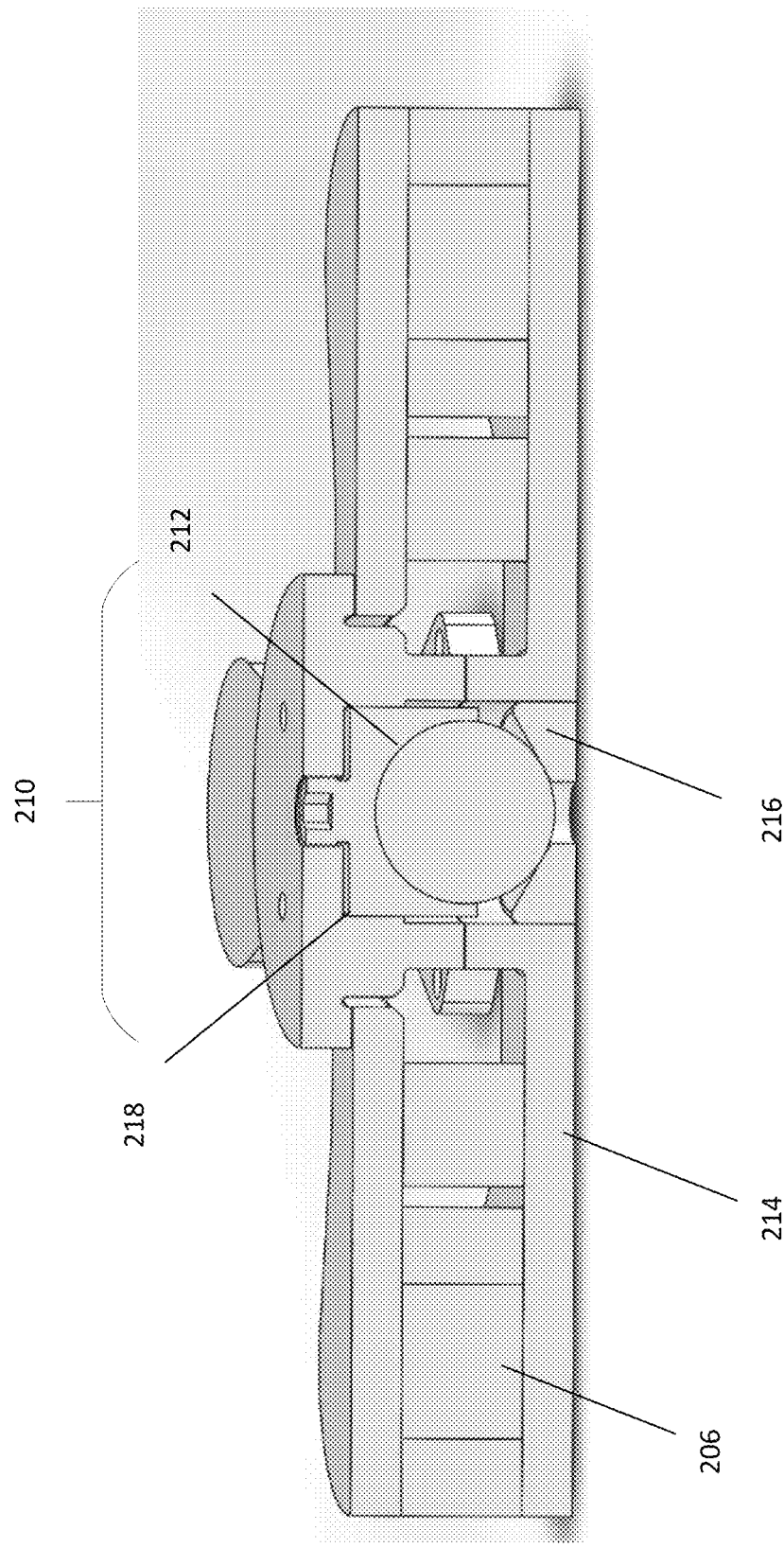

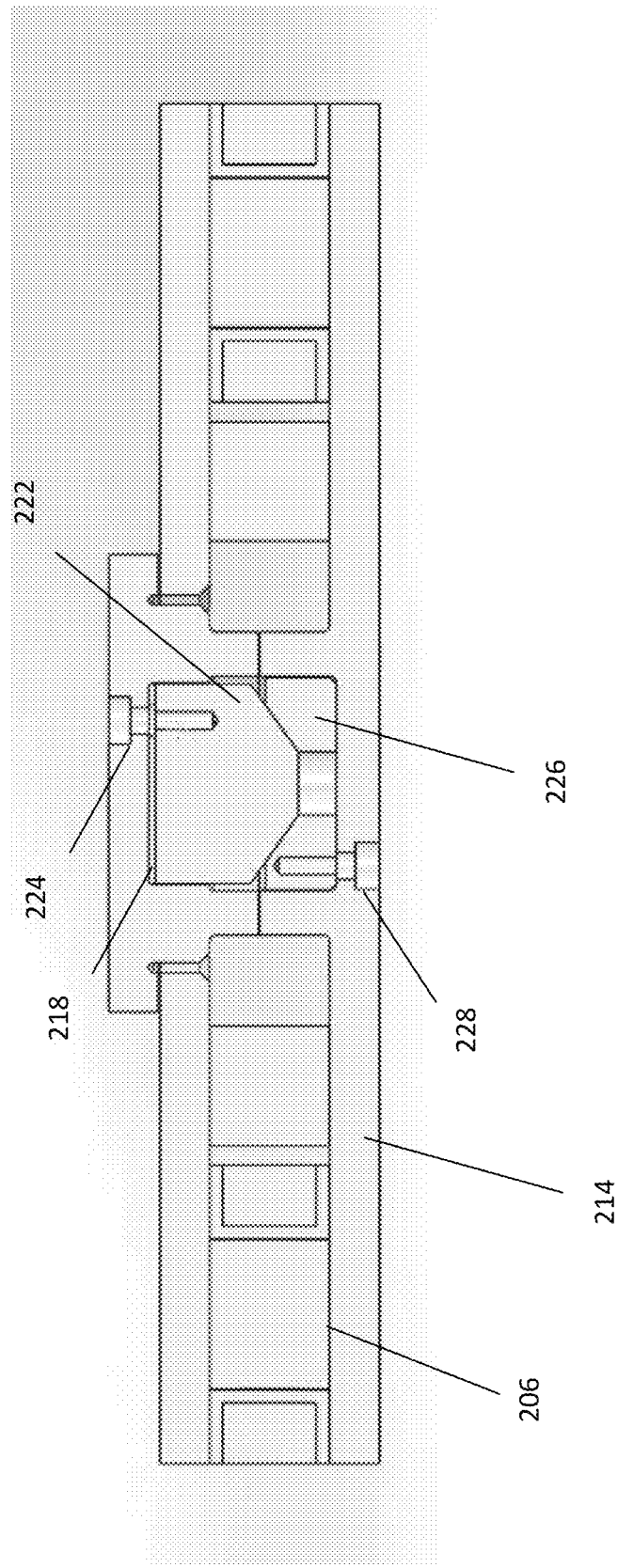

1102

1100

INTEGRATED ELECTRO-MAGNETICALLY PRELOADED KINEMATIC JOINT FOR ON-ORBIT ASSEMBLY OF MODULAR SPACE VEHICLES

STATEMENT OF GOVERNMENT INTEREST

This invention was made with government support under Contract No. FA8802-19-C-0001 awarded by the Department of the Air Force. The government has certain rights in the invention.

FIELD

The present invention relates to an on-orbit payload and spacecraft bus integration system.

BACKGROUND

There is an effort to create a standard interface between payloads and buses, intended for on-orbit integration between the payload and bus. This requires a different kind of interface than what would be implemented for ground integration.

All interfaces on a traditionally assembled spacecraft must be designed to survive the launch environment. For example, launch loads are applied for a relatively short time, i.e., 6 to 10 minutes of a mission that typically last for more than 10 years. Traditional interfaces are mass optimized, unique for each mission, and attached using typical fastening hardware, which utilizes human labor for installation. They are therefore expensive to build, require extensive structural analysis, do not allow for modularity of the spacecraft, and cannot be a part of a trend towards on orbit operations such as robotic servicing and assembly.

The current state of the art does not allow for on-orbit servicing or assembly of a space vehicle. For example, traditional spacecrafts are not designed for servicing on-orbit. Servicing on-orbit has only been accomplished as demonstrations, not as routine in the industry. Robotic servicing has only been done as demonstration. Assembly on orbit has been limited to human occupied space stations, which again utilize human labor for assembly.

Accordingly, it may be beneficial to solve existing problems by establishing robust mechanical connections that support the loads created by station keeping and orbital maneuvers, creating a mechanical interface that is controlled remotely without the application of specialized tools, and allowing for a common interface that facilitates the replacement, upgrade and maintenance of the spacecraft or it's subsystems.

SUMMARY

Certain embodiments of the present invention may provide solutions to the problems and needs in the art that have not yet been fully identified, appreciated, or solved by current payload and bus integration technologies. For example, some embodiments of the present invention pertain to a payload and bus integration system.

In one embodiment, a payload-bus kinematic interface system includes one or more kinematic devices. Each kinematic device includes a first contacting surface and a second contacting surface. The first contacting surface kinematically interfaces with the second contacting surface, passing loads and providing positioning and alignment to the second contacting surface.

In another embodiment, system provides an interface between a payload and a bus. The system includes a plurality of kinematic devices arranged in a pattern to support expected on-orbit maneuver loads, and one or more electropermanent magnets (EPMs) surrounding each of the plurality of kinematic devices. Each of the plurality of kinematic devices includes a first complementary surface attached to a first adjacent surface and a second complementary surface attached to a second adjacent surface. The first complementary surface and the second complementary surface are configured to provide a mechanical connection integrated with the one or more EPMs.

In yet another embodiment, a payload-bus kinematic interface system includes one or more kinematic devices arranged in a pattern between a payload and a bus. Each of the one or more kinematic devices include a first contacting surface, a second contacting surface, and a plurality of EPMs surrounding the first contacting surface and the second contacting surface. Further, each of the plurality of EPMs apply a magnetically induced preload. The magnetically induced preload with the first contacting surface and the second contacting surface constrain up to 6 degrees of freedom (DOF).

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1A is a perspective view and FIG. 1B is a cross-section view illustrating a cup-cone (kinematically complementary) interface, according to an embodiment of the present invention.

FIGS. 2A and 2B are diagrams illustrating a perspective view of 5 DOF constrained kinematic system 200, according to an embodiment of the present invention.

FIG. 2C is a diagram illustrating a cross-section of a 3 DOF constrained kinematic system, according to an embodiment of the present invention.

FIG. 2D is a diagram illustrating a cross-section of a 5 DOF constrained kinematic system, according to an embodiment of the present invention.

DETAILED DESCRIPTION OF THE EMBODIMENTS

Figure 3:
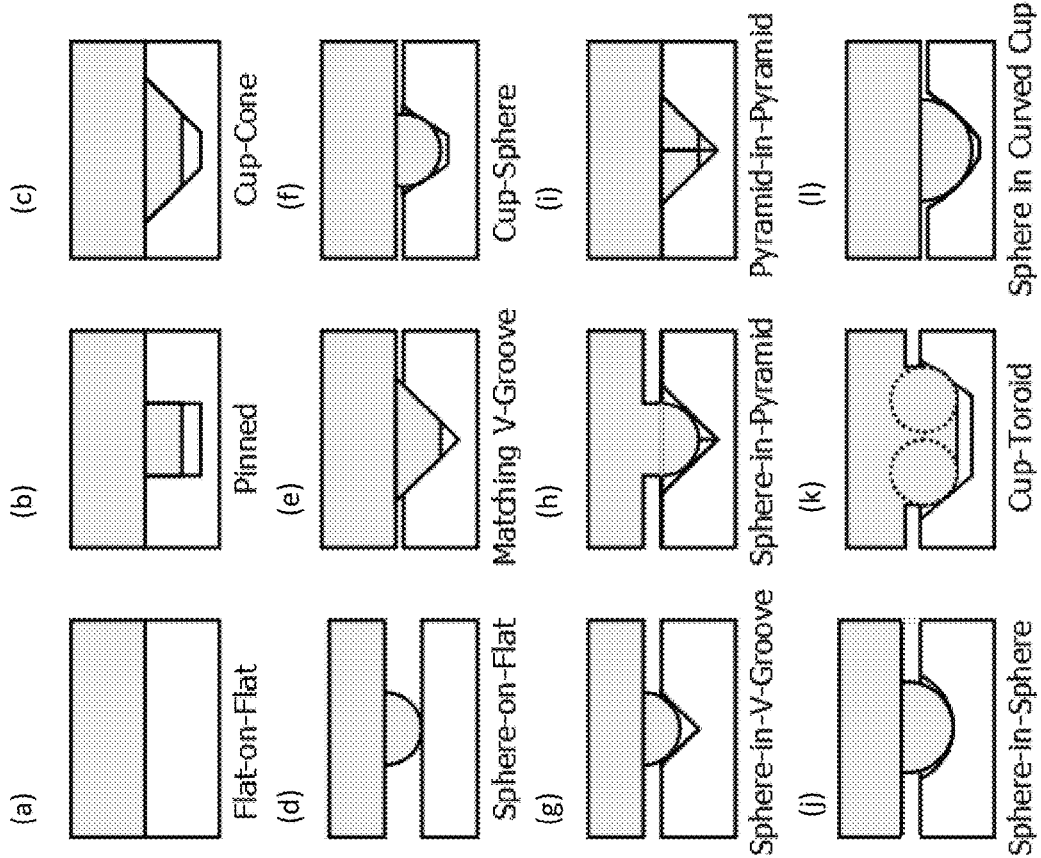
FIG. 3 is a diagram illustrating a plurality of complementary kinematic contacting surfaces and bodies which provide a physical and mechanical connection that control different degrees of freedom, according to an embodiment of the present invention.

Some embodiments of the present invention pertain to a payload and bus integration system. To accomplish this, a physical and mechanical connection between the payload and bus is required, and also a technique to obtain the physical connection between the payload and bus is required. For example, a payload and bus integration system might include multiple kinematic devices (hereinafter the "device") arranged in a pattern to support the expected on-orbit maneuver loads. Each device is designed to support loads in a certain direction based on the choice of complementary surface. For example, each device includes complementary kinematic surfaces (the "cup-cone") that provides the mechanical connection integrated with an electro-permanent magnet, which provides the clamping and restraining force. This so-called "cup-cones" are often used in various spacecraft components, as well as ground based components. In some embodiments, "cup-cone" refers to a number of complementary contacting kinematic surfaces designed to control motion and allow forces to pass between the contacting parts. An actual cup-cone (both conical surfaces) is one example. This cup-cone configuration serves as a physical and mechanical interface between the payload and the bus. The device also includes complementary kinematic surfaces (i.e., the cup-cone) and an EPM clamp.

This cup-cone is a physical interface, provides positioning and alignment, and allows loads to pass across the connection. In order for certain amounts of loads to pass through a contact, the choice of materials and coatings is important. In this embodiment, high hardness materials and coatings are used to prevent surface damage and allow for the smallest amount of material to support the highest amount of load. For example, 440C stainless steel, commonly used in ball bearings, can be used for its high hardness. Hardness, which is related to yield strength, is a measure of resistance to damage due to contact (surface) stress. Coatings, such as ferritic nitro-carburizing, can be used to provide a high hardness, low friction, galling resistant, and wear resistance surface. Lubricants, such as PTFE or molybdenum disulfide, can be used (applied to the contacting surfaces) to further reduce friction and prevent galling. Because the cup-cone interface materials should not provide a magnetic flux path, one of the materials should be non-magnetic.

FIG. 1A is a perspective view and FIG. 1B is a cross-section view illustrating a cup-cone (kinematically complementary) interface 100, according to an embodiment of the present invention. In this embodiment, cone 102 may include a plurality of mounting features 104 and a cone-sphere 106 that interfaces with a receiving portion (or beveled interface zone) 110, which is part of cup 108. Similar to cone 102, cup 108 also includes a plurality of mounting features 112. It should be appreciated that receiving portion 110 is configured to transfer loads from cup 108 to cone 102, thereby providing a mechanical connection between bodies attached to the respective cup and cone components.

In some embodiments, mounting features 104 and 112 are bolt circles (or holes) for assembling cone 102 on a structure and assembling cup 108 onto another structure. For example, mounting features 104, 110 allow the complementary contacting bodies to be integrated with the EPM and facilitate adjustment of the contacting surfaces to account for manufacturing tolerances. The separate mounting of the contacting bodies also allows for separate manufacture and selection of the EPM and "cup-cone".

Simply put, mounting features 104 and 112 is one way to attach cup-cone interface to supporting structures. For example, rather than using mounting features 104 and 112, press fit may be used to achieve a similar result.

The top of receiving portion 110 includes a bevel 116 that aids with the initial alignment of cone 102 as the parts are brought together during on-orbit attachment and assembly. This feature aids the robotic operations as it allows for some misalignment as the components are brought together. Additionally, cup 108 includes a lateral slipping support 114 that supports lateral loads if the applied lateral loads exceeds the capability of the preloaded conical cup and sphere. For example, the force provided by the electro-permanent magnet acts in the vertical direction of the figure and acts to preload the contacting surfaces. If an external force acts between the parts, then the force is supported by these contacts. The lateral force capability of the contacting surfaces is limited by the preload provided by the EPM, the contact angle, and the friction. If the external lateral force exceeds the lateral capability, then the contacting surfaces begin to slide. If sliding occurs, the lateral support feature is then engaged and acts as a second set of contacting surfaces, which is configured to better pass loads between parts in the lateral direction and is not dependent on the preload for its lateral load capability.

It should be appreciated that thermal management is critical for space systems to operate reliably and as intended. Part of thermal management includes controlling heat flow between subsystems by either providing low resistance heat flux paths or by increasing resistance of existing heat flux paths. Since the device is intended to act as a structural connection between a spacecraft bus and payload, the device will also act as a thermal pathway between the spacecraft bus and payload. It should be noted that heat flows by either radiation, convection, or conduction. As a structural component with a physical connection, the device acts as a conductive thermal pathway. To increase thermal resistance across the device, thermal insulative washers 130, 132 are included at the cup and cone mounting interfaces to decrease thermal conductance. These thermal insulation washers 132 provide a system integrator with an option to tune (i.e., to maximize or minimize) the thermal pathway across the device and between the bus and payload.

FIGS. 2A and 2B are diagrams illustrating a perspective view of a 5 DOF constrained kinematic system 200, according to an embodiment of the present invention. In some embodiments, there is a magnetic induced preload applied to cone 202. The magnetic induced preload is applied by EMPs 206. For purposes of explanation, magnetically induced preload combined with the complementary kinematic surfaces constrain the 6 DOF, which include three transitional and three rotational DOF. One of the transitional DOF is the insertion axis, which is constrained by the induced magnetic preload.

Each EPM 206 is constructed from multiple components. For instance, a neodymium magnet provides majority of the flux in the system. Additionally, each EPM 206 includes an AlNiCo 5 magnet configured to act as a flux guide and to provide additional flux in the system. The coil in some embodiments control the coercivity direction of the AlNiCo 5 magnet. The coil may be sized to induce a magnetic field that can reverse the coercivity direction of the AlNiCo 5 magnet. Further, ferromagnetic flux guides are used in certain embodiments. These guides direct the flux based on the AlNiCo 5 magnet coercivity direction. The flux guides may also be referred to as magnetic pole pieces.

In an embodiment, the physical interface between cone 202 and cup 204 may control (or constrain) different numbers of DOF depending on the complementary contacting surfaces used. For example, for one particular mechanism, the physical interface controls 5 DOF, and for another mechanism the physical interface controls 1 DOF. The preloaded interface can therefore provide a range of constraints ranging from 1 to 6 DOF.

To control the unconstraining DOF, the physical interface allows cone 202 to rotate no more than a certain range of motion. For example, the range is limited by the requirement for maintaining a non-collapsible magnetic airgap in the device. In one embodiment, a spherical cone may constrain a lower number of DOF (3), i.e., the three transitional axes, than that of a pyramidal cone (6). See, for example, FIG. 3(*e*). The rectangular cone by its very nature may not be able to rotate or translate in any axis. See, for example, FIG. 3(*b*). In other words, depending on the shape of cup 204, cone 202, and the physical interface itself, the DOF may vary from 1 DOF to a maximum 6 DOF.

It should be appreciated that using an arrangement of devices that constrains more than six (6) DOF would lead to an over-constrained system, and may not function properly. However, this depends on the number of devices and the constrains on the DOF from those devices on the payload and bus integration system. For the pattern, being able to choose the DOF for each device allows for the over constraint to be mitigated or completely avoided.

FIG. 3 is a diagram illustrating a plurality of complementary kinematic contacting surfaces and bodies which provide a physical and mechanical connection 300(*a*)-(*m*) that control different DOF, according to an embodiment of the present invention. The choice of complementary bodies and surfaces depends on the specific application of the device and the desired degrees of freedom or constraint of motion. Some complementary surfaces provide increased load density (i.e., load capability over device weight and volume). Other complementary bodies and surfaces may require tighter tolerances to perform satisfactorily. Since each pair of complementary surfaces has a range of capabilities in terms of cost and performance, the different combinations offer options for different applications. In this embodiment, although 12 different physical connections are shown, the embodiment may not be limited to these different physical connections.

Returning to FIGS. 2A and 2B, during operation, a payload, which may have a plurality of these devices, is maneuvered into position by an assistant. The assistant may be a robot arm or a tug. By maneuvering the payload, cone 202 is placed in close proximity to cup 204 to facilitating the mating process.

In certain embodiments, the initial alignment may be about ½ the diameter of the cone inserts. For example, with the embodiment shown in FIG. 2C, the initial misalignment can be 19 mm (0.75 inches), and with the embodiment shown in FIG. 2D, the initial misalignment can be 17 mm (0.67 inches). These misalignments allow the cone connectors to start into the cups. Although other design features should be cleared as the insertion process completes, cone 202 is ultimately centered into cup 204. These distances get proportionally larger or smaller depending on the size and shape of the design. Additionally, more tolerant alignment features may be added to increase the initial misalignment tolerance The concept of operation to mate a new payload involves maneuvering the tug and payload to close proximity in orbit (e.g., 2 meters) through a series of orbital maneuvers performed by the tug. When the tug is in close proximity, the assistant engages the approaching payload. The payload is disengaged by the tug and is now controlled by the assistant. The assistant then maneuvers the payload into position over the kinematic joints and inserts the cones into the cups. The EPMs are then switched to an "ON" state to apply the clamping forces in the array of connectors. It should be noted that some embodiments may use one or more devices per payload. This may change depending on the parameters to operate the mission. The assistant is then disengaged and can be stowed, and the payload is now connected and ready for use. Additionally, the used payload can be first removed to make room for the new payload by following the procedure in reverse to remove the used payload.

Upon mating of cup 202 with the cone (otherwise known as kinematic joint attachments) 204, EPMs 206 are switched to the "ON" state applying holding forces to the cup-cone interface 200, thereby redirecting the flux in the vertical direction. In other words, the flux turns 90 degrees and is guided perpendicular to the first horizontal air gap, and the cup then guides the flux to turn 180 degrees and flows in the opposite vertical direction across the second horizontal air gap. The flux is then guided to the bottom plate for return to the magnets. This allows the holding forces to preload the kinematic joints, i.e., hold cup 202 and cone 204 in place. For purposes of explanation, preload refers to the applied clamping force, that is the force that would need to be overcome to separate the joint or pull it apart. Preload may be defined in some embodiments as the force holding the contacting surfaces together.

In some embodiments, EPMs are used because the EPMs require no power in the "ON" and "OFF" states, and have no moving mechanical parts. EPMs are also electrically switchable, and have low size, weight, and power (SWaP) requirements. Further, EMPs are highly reliable, and can be used repeatably. It should be noted, however, that the cup-cone interface may be combined with other features like thermal management, electrical power connections, and communications interfaces to name a few.

It should be appreciated that this cup-cone interface system (or kinematic system) is fully reversible, in so far that when the assistant (not shown) is attached, EPMs 206 are switch to an "OFF" state. By switching to the "OFF" state, the kinematic joints (i.e., cone 202 and cup 204) are de-mated, allowing the assistant to move the payload to a safe location for release.

FIG. 2C is a diagram illustrating a cross-section of a 3 DOF constrained kinematic system 200C, according to an embodiment of the present invention. In FIG. 2C, a ball-cone 210 instantiation of the more general cone interface is used. Ball-cone 210 is created by combining a cone 202 with a ball holder insert 212. In this embodiment, ball holder 212 is threaded into the cone 202; however, the design is not limited to this attachment method. It should be noted that ball holder 212 does not create a magnetic flux path. In other words, ball holder 212 is made from non-magnetic materials. A spacer 218 is selected to set the height of the of ball holder 212 in cone 202 to maintain proper airgap distances. Cup insert 216 in this embodiment is pressed into base plate 214 to from cup 204. Cup insert 216 material is selected to be a hardened stainless steel or equivalent material. The hardness of cup insert 216 is selected to match ball holder 212 material hardness.

FIG. 2D is a diagram illustrating a cross-section of a 5 DOF kinematic system 200D, according to an embodiment of the present invention. In FIG. 2D, a cone-cone 220 instantiation of the more general cone interface is shown. Cone-cone 220 is created by combining a cone 202 with a holder insert 222. In this embodiment, cone holder 222 is attached by threaded fasteners 224 into cone 202. This design however is not limited to this attachment method.

Cone holder 222 does not create a magnetic flux path, in this embodiment, and is made from non-magnetic materials. A spacer 218 is selected to set the height of the of cone holder 222 in cone 202 to maintain proper airgap distances. Cup insert 226 in this embodiment is inserted into base plate 214 to from cup 204. Cup insert 226 is attached by threaded fasteners 228 to cup 204. Cup insert 226 material is selected to be a hardened stainless steel or equivalent material. The hardness of cup insert 226 is selected to match the cone holder 222 material hardness.

Some embodiments resolve the fundamental problems associated with on-orbit assembly and serving operation by (1) establishing a robust mechanical connections that can support the loads created by station keeping and orbital maneuvers, (2) creating a mechanical interface that can be controlled remotely without the application of specialized tools, and (3) allowing for a common interface (cup-cone interface that facilitates the replacement, upgrade, and maintenance of the spacecraft or it's subsystems. In other words, some embodiments may allow for 3 or more of devices arranged in a pattern that can be standardized.

Some embodiments may also reduce the size, weight and power required for kinematic mounts. For example, support loads created during launch do not occur with these embodiments. Without the creation of support loads during launch reaction forces are reduced by 2 orders-of-magnitude, mass is reduced to support lower loads, and the mechanical interface volume is reduced for the connection points.

Additionally, with the cup-cone configuration, the pulsed power required to operate the EPMs is applied in 10 mSec or shorter Pulses. In some embodiments, EPMs are bi-stable magnets, and do not require power to maintain the "ON" or "OFF" state. For example, by applying short pulses of current to the EPM coils the control magnets polarity is permanently reversed. Once the polarity is reversed, the control magnet remains in the new state indefinitely without power being applied. It should be noted that power may only be required to transition between the "ON" and "OFF" states. In other words, the power is limited to turning the EPMs on and off.

Figure 4:
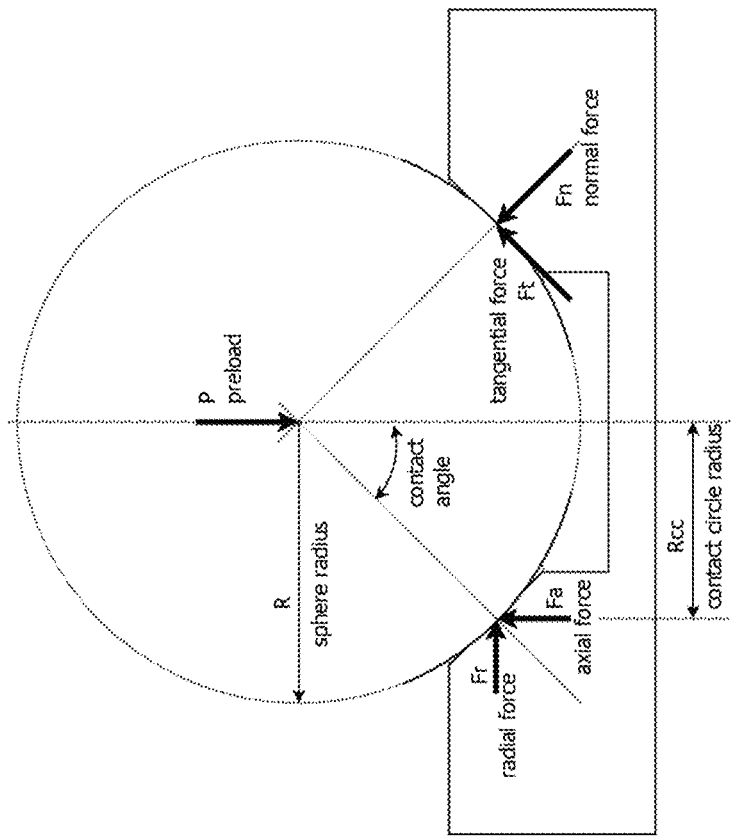
FIG. 4 is a diagram illustrating the geometry and certain design parameters for a kinematic complementary pair of surfaces which includes a conical cup and sphere, according to an embodiment of the present invention.

FIG. 4 is a diagram 400 illustrating the geometry and certain design parameters for a kinematic complementary pair of surfaces which includes a conical cup and sphere, according to an embodiment of the present invention. A preload provided by the electropermanent magnet compresses the two bodies together. Contact occurs along a ring of material where the sphere meets the conical cup. The angle of the cone determines the distribution of the preload to axial and radial forces as well as the normal contact force. The friction between the contacting surfaces will determine the tangential force at the contact. The combination of sphere radius and cone angle will determine the mean radius of the contacting surface. The material properties and contact geometry will determine the contact stress and deflection at the contacting surfaces. The materials and geometry can/must be chosen to avoid exceeding the material stress capability while providing the desired preload for the application. The contact angle should be chosen to avoid taper locking, which could prevent separation of the contacting bodies.

Figure 5:
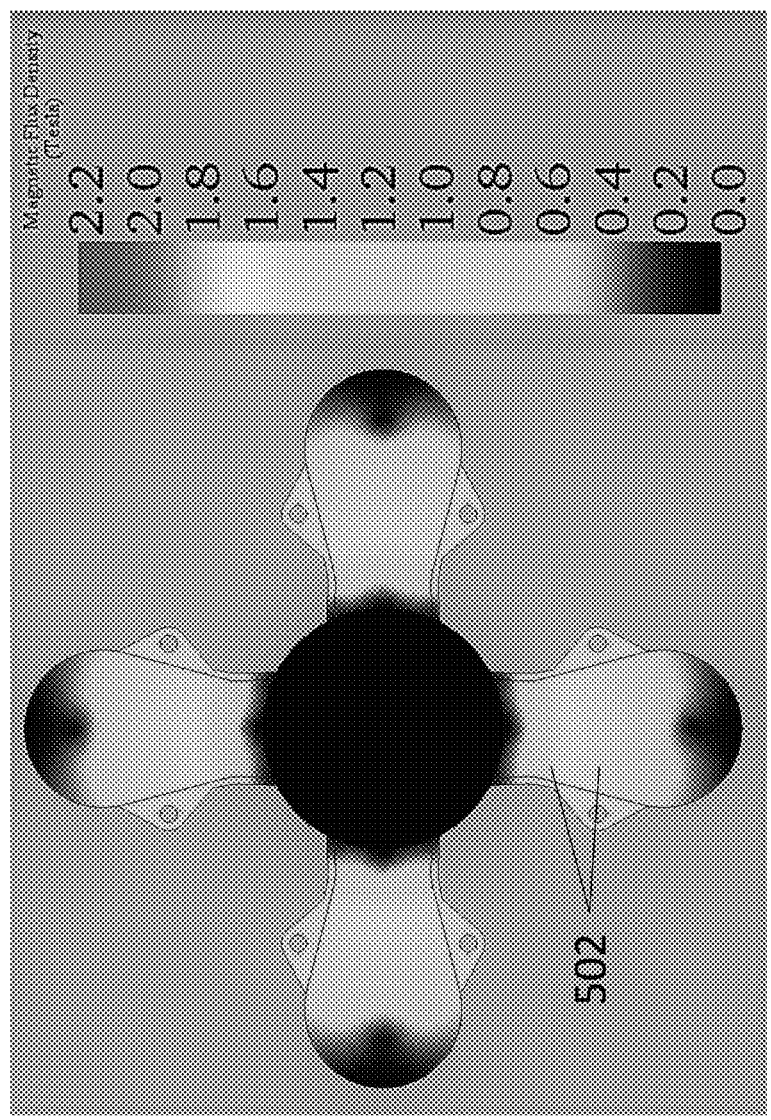
FIG. 5 is a diagram illustrating a flow of magnetic flux in EPM in the off state, according to an embodiment of the present invention.

FIG. 5 is a diagram 500 illustrating a flow of magnetic flux in the EPMs in the off state, according to an embodiment of the present invention. The magnetic flux in the system flows from the EPM into the top plate and is visualized in region 502. The flux circulates through the top plates radially outward and then into the control magnet. The process is repeated but not shown in the base plate. Diagram 500 also shows that flux in not flowing inwardly towards the center of the device. This indicates that flux is not crossing the internal airgap which would create a clamping force.

The design requires the flux to flow in the vertical direction across both airgaps to create the clamping force. In the on state the flux is flowing horizontally in the EPM top plate as it approaches the first airgap. To maximize the effectiveness of the design the flux is turned or guided into the vertical direction by the placing a lip on the cone that overhangs the EPM top plate. Additional features were added to improve the design such as fillets on the EPM top plate and cone, large spacing between the end of the EPM top plate and the cone, and a cutout in the cone near the airgap. These features make the airgap the lowest reluctance path (preferred path) for the flux. In this way the flux is turned and crosses the air gap creating a portion of the overall clamping force.

The device materials are selected to have high magnetic permeability. Examples of this type of material include annealed low carbon steels, silicon iron, 430 stainless steels, etc. These types of material are used for the cone to guide the flux that crosses vertically across the first airgap towards the second airgap located between the cone and the cup. The high permeability material is used in the cup to guide the flux back to the magnets to close the flux path.

To ensure that all the magnetic flux in the system crosses the airgaps between the cup and cone, the cone holders do not create flux paths; or in other words, they are a combination of non-magnetic material. These types of material include 300 series stainless steel, titanium, aluminum, silicon nitride, etc. The choice of these materials is based on their non-magnetic nature and high mechanical stiffness needed to pass applied loads through the joint. The cup insert is selected for high mechanical stiffness and hardenability. These types of materials include 440C stainless steel, alloy steels, titanium, etc. There are no restrictions on the permeability of the cup inserts as the high hardness of the steels or non-magnetic nature of the materials limits the permeability of the cup inserts. Since the cone holder is non-magnetic the cup inserts will not contribute to the magnetic characteristics of the system.

Figure 6:
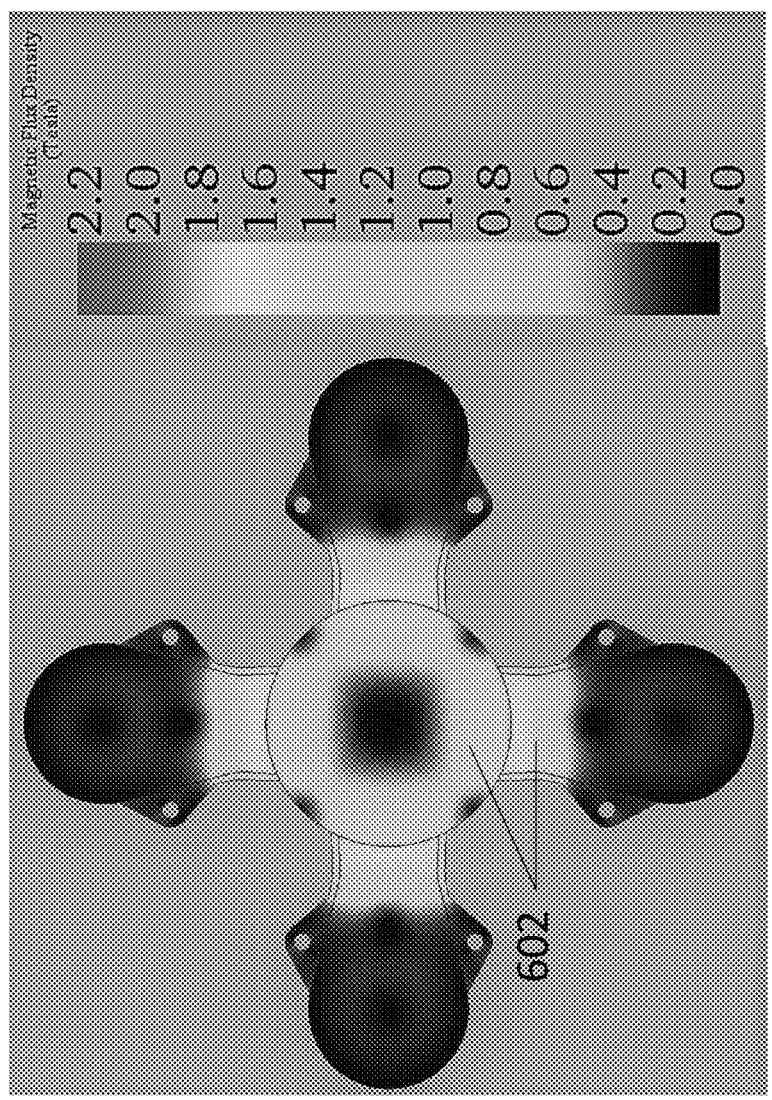
FIG. 6 is a diagram illustrating the flow of the magnetic flux in the EPMs in the "ON" state, according to an embodiment of the present invention.

FIG. 6 is a diagram 600 illustrating the flow of the magnetic flux in the EPMs in the "ON" state, according to an embodiment of the present invention. The magnetic flux in the system flows from the magnet and control magnet into the top plate, and the combined flux is visualized in region 602. The flux turns and flows across the first airgap and is visualized as the lighter shaded regions on the cone. The flux then flows down the outer area of the cone across the second airgap into the cup. The lack of flux flowing in the center of the cone is an indication of the non-magnetic nature of the cone holders. The process is completed in the base plate as the flux is guided back to the magnet and control magnet. The flux crossing the two airgaps creates the vertical clamping force.

Figure 7:
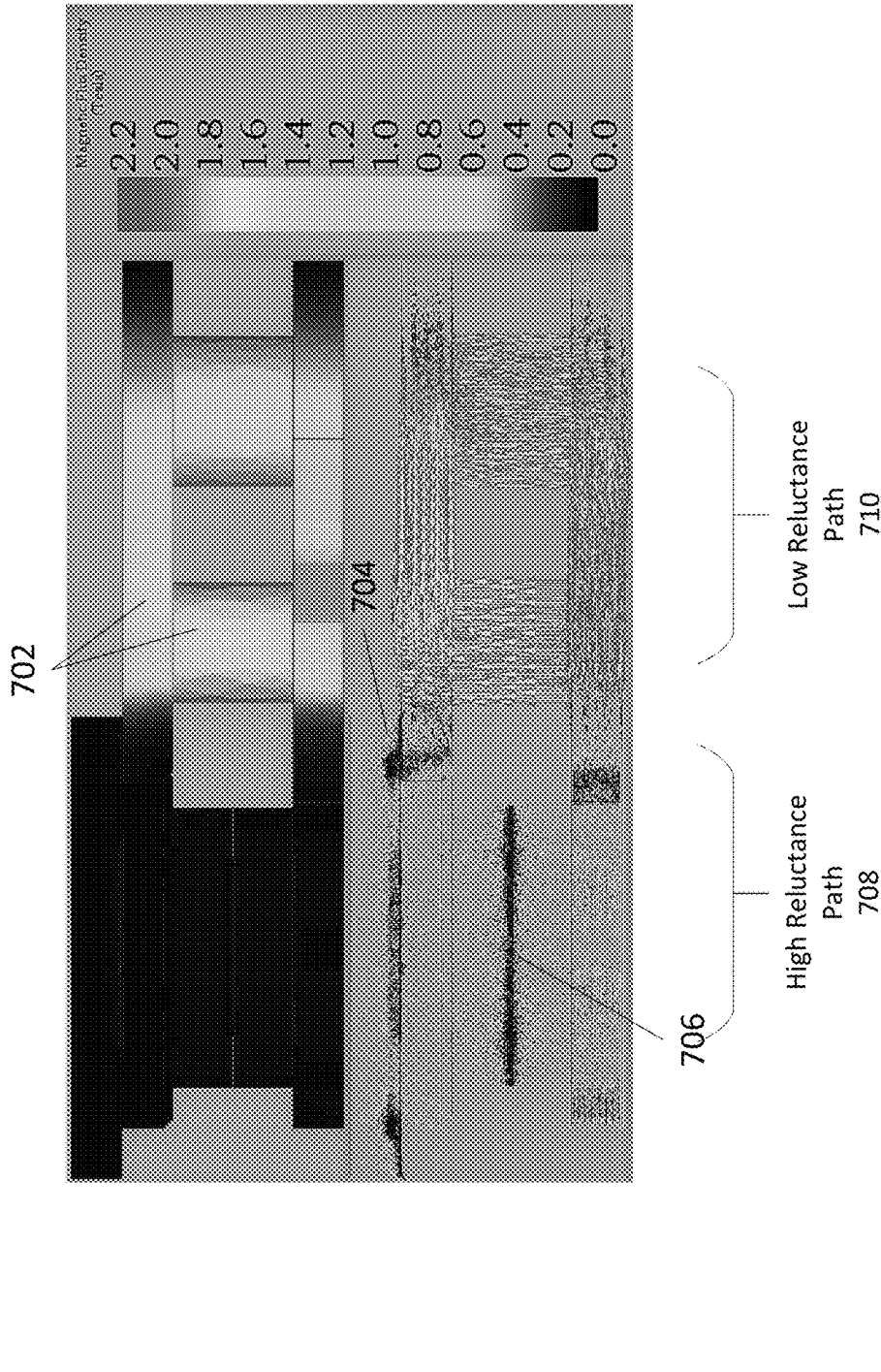
FIG. 7 is a diagram illustrating an isolated view of a single EPM and a section view of the flux flowing in the EPM in the off state, according to an embodiment of the present invention.

FIG. 7 is a diagram 700 illustrating an isolated view of a single EPM and a section view of the flux flowing in the EPM in the off state, according to an embodiment of the present invention. The magnetic flux in the system flows from the magnet into the top plate and is visualized in region or vectors 702. The flux circulates through the top plates outward and then into the control magnet. The process is repeated in the base plate, where the flux circulates through the base plate inwardly from the control magnet back to the magnet. Diagram 700 also shows that the flux in not flowing inwardly towards the center of the device. This is the low reluctance path. Diagram 700 indicates that flux is not crossing the internal airgaps 704, 706, of the high reluctance path 708, which would create a clamping force.

Maintaining airgap 704 and 706 spacing is essential to the proper function of the EPMs. In the "OFF" configuration, two flux paths are present in the device. Low reluctance path 710 is created between the magnet and control magnet by the presence of airgaps 704 and 706 of the high reluctance path 708. Since air or vacuum has a high reluctance compared to magnetically soft steel even small gaps creates a relatively high reluctance. If airgaps 704 and 706 are allowed to collapse, reluctance paths 708 and 710 equalize and flux will flow in both directions.

Since flux is flowing through the center of the device, a clamping force is created, which cannot be switched off rendering the system unusable. In this system, airgaps 704 and 706 are maintained using the height adjusting spaces that sets the airgap width. It should be appreciated that in other systems the airgaps are set using non-magnetic spacers placed in airgap 704 or 706 or by other means that prevent the cone from contacting the EPM top plate and or cup base plate.

Figure 8:
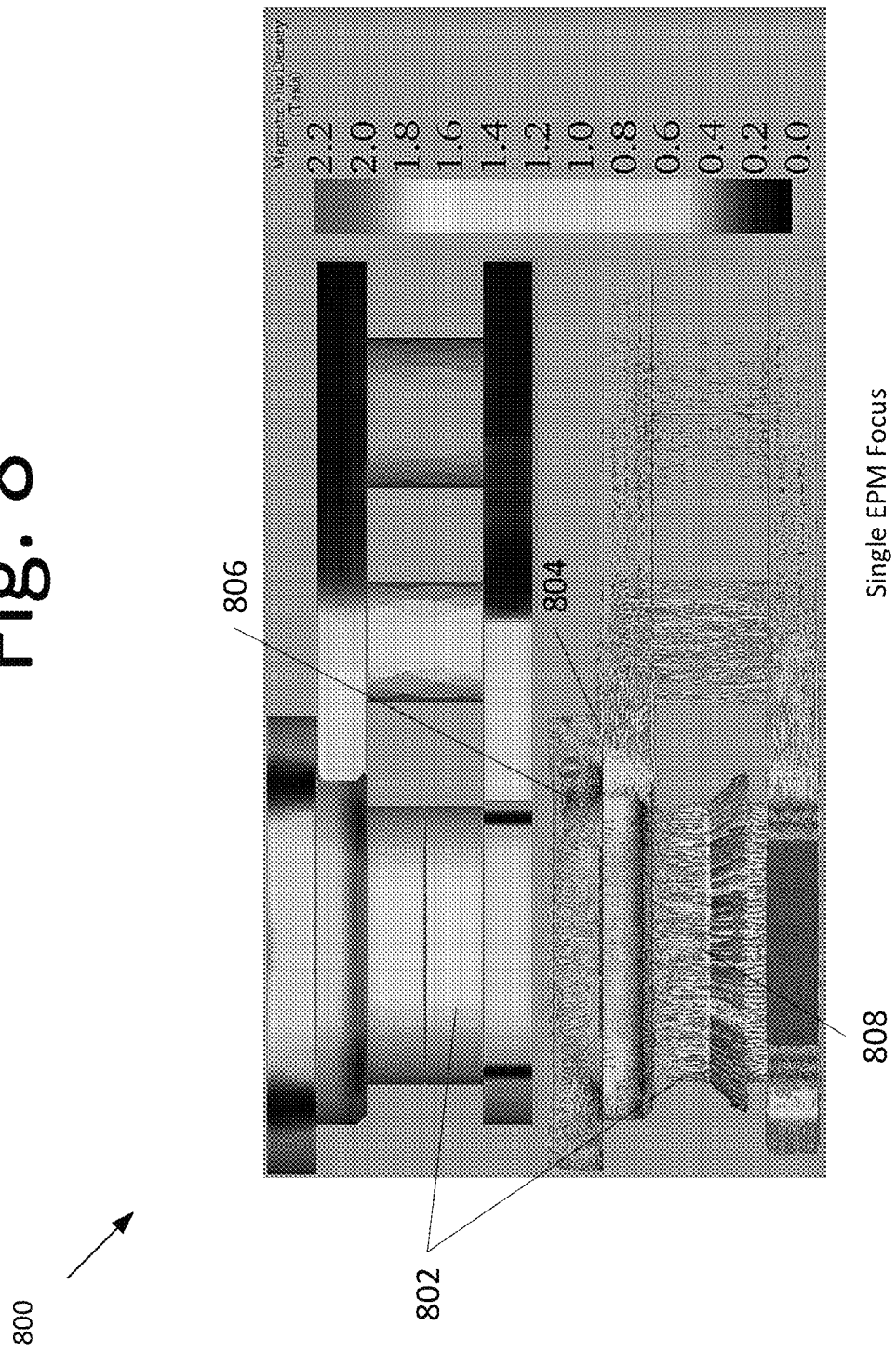
FIG. 8 is a diagram illustrating an isolated view of a single EPM and a section view of the flux flowing in the EPM in the "ON" state, according to an embodiment of the present invention.

FIG. 8 is a diagram 800 illustrating an isolated view of a single EPM and a section view of the flux flowing in the EPM in the "ON" state, according to an embodiment of the present invention. The magnetic flux in the system flows from the magnet and control magnet into the top plate and the combined flux is visualized as shown in 802. The flux turns and flows across first airgap 804 and is visualized in regions 806 as vectors on or in the cone. From the direction of the flux vectors it can be seen that the flux direction has been turned to the extent possible to flow vertically across first airgap 804. The flux then turns and flows down the outer area of the cone across second airgap 808 into the cup. The flux is visualized in region 802 or downward flux vectors crossing second airgap 808. The process is completed in the base plate as the flux is guided back to the magnet and control magnet. The flux crossing two airgaps 804 and 808 creates the vertical clamping force.

In this embodiment, airgaps 804 and 808 are maintained by the height adjusting shim between the cone and ball holder. The airgap spacing sets the clamping force that will be generated when the flux is directed across the airgap. Only the vertical component of the flux vector will generate clamping force so it is important that the flux is guided, to the extent possible, in a purely vertical direction.

Figure 9:
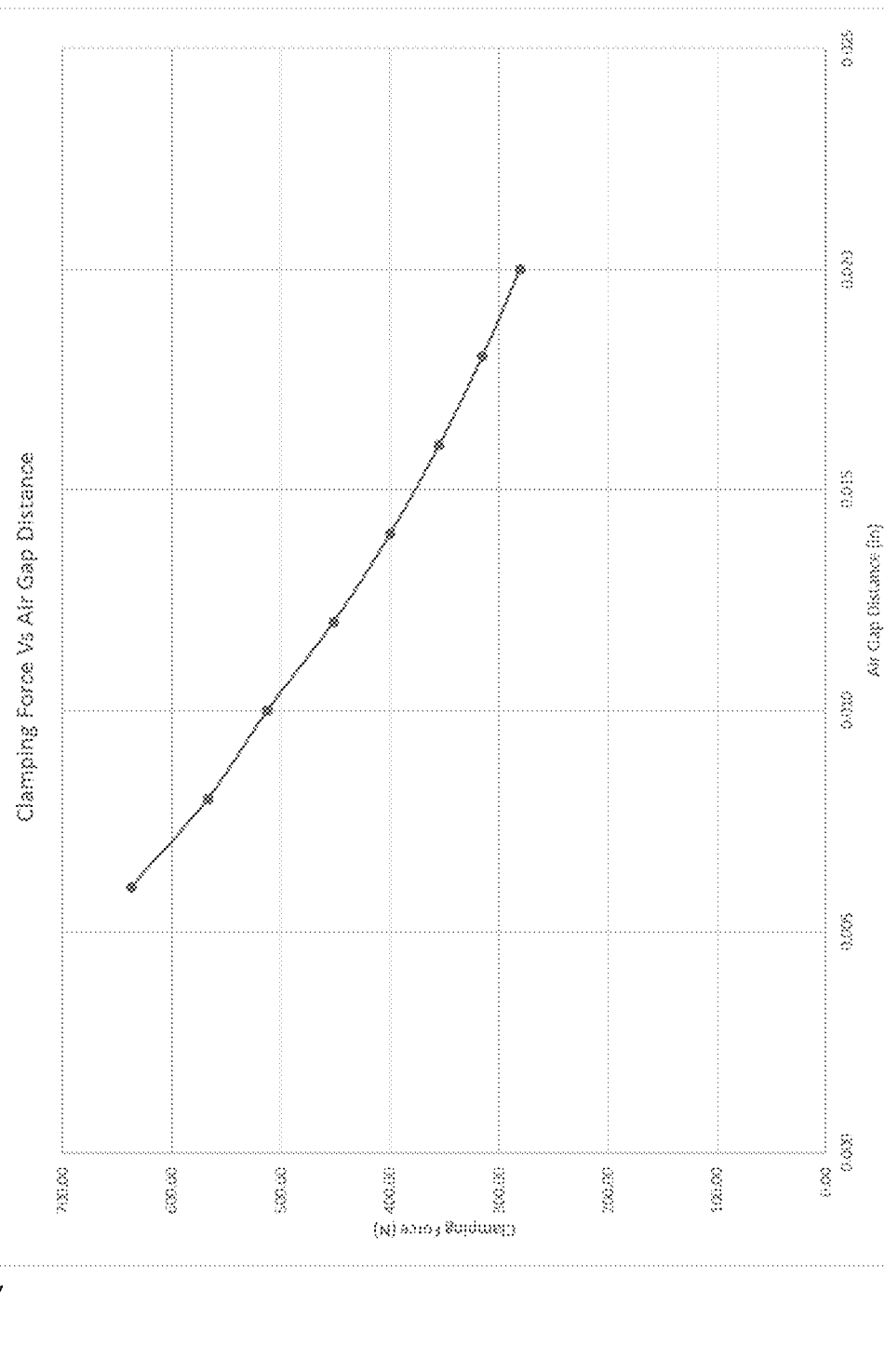
FIG. 9 is a graph illustrating a clamping force generated verse the total airgap in the system, according to an embodiment of the present invention.

FIG. 9 is a graph 900 illustrating a clamping force generated verse the total airgap in the system, according to an embodiment of the present invention. It should be appreciated that the clamping force is a function of the total airgap distance in the system. As shown in graph 900, the clamping force increases as the total airgap decrease. For this embodiment, sufficient clamping force is generated from 0.006 inches to 0.020 inches of total airgap.

Figure 10:
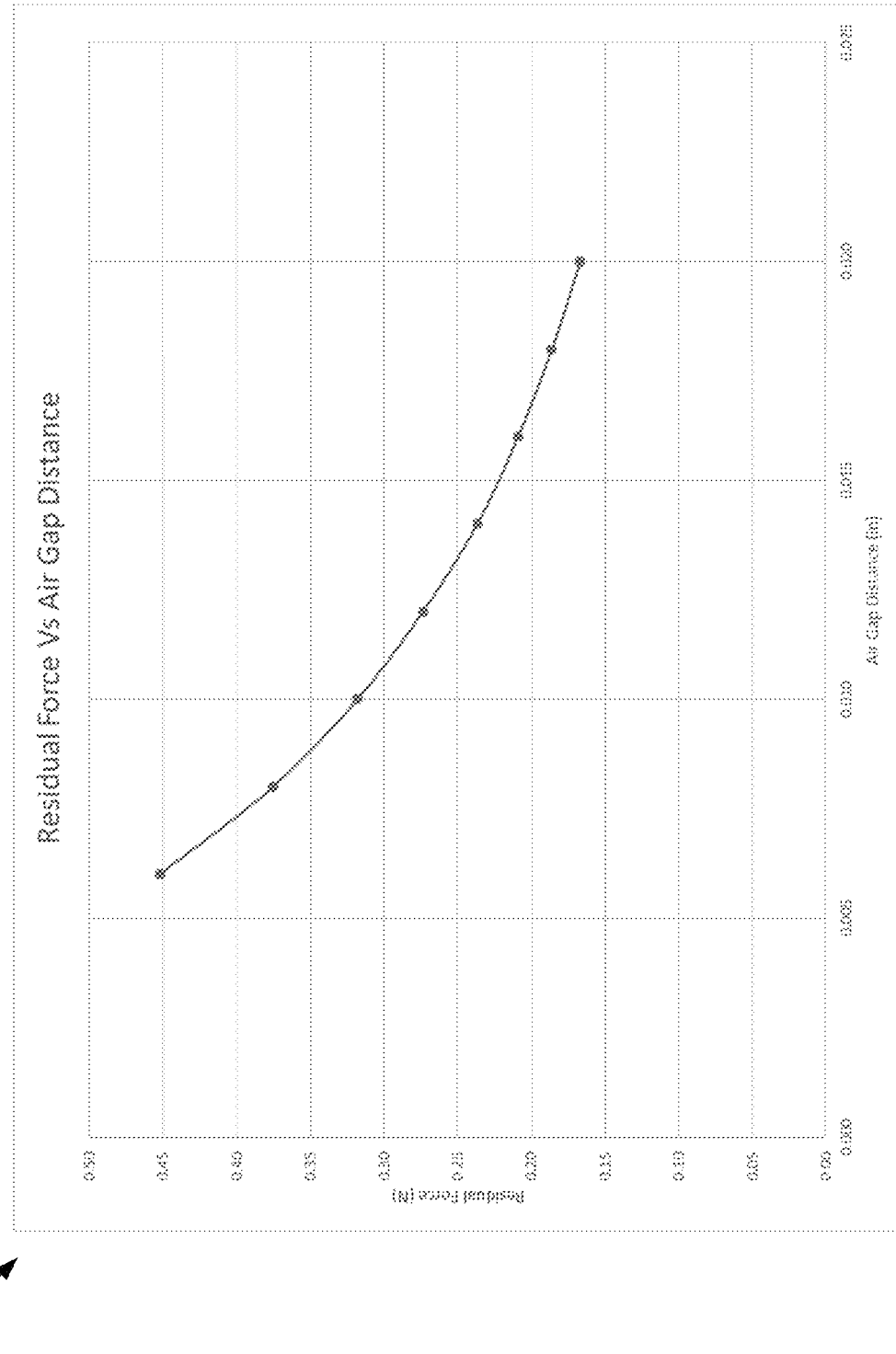
FIG. 10 is a graph illustrating the residual force generated verses airgap distance, according to an embodiment of the present invention.

FIG. 10 is a graph 1000 illustrating the residual force generated verses airgap distance, according to an embodiment of the present invention. It should be appreciated that the residual force is not desirable and should be minimized. It should be also noted that the residual force is a function of the total airgap distance in the system. As shown in graph 1000, the residual force increases as the total airgap decrease. For this embodiment, the residual force generated at 0.006 inches of total airgap was selected as the limit.

Figure 11A:
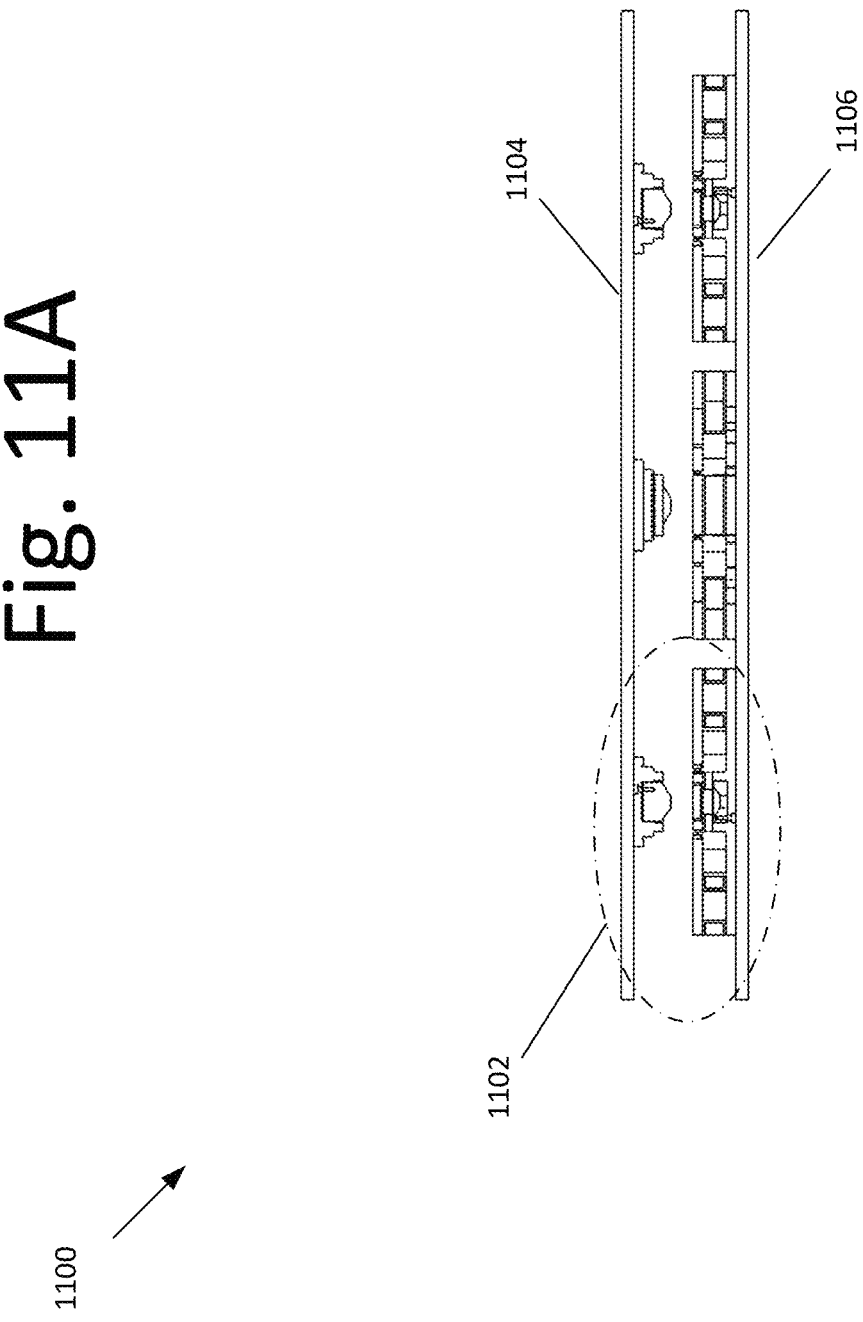
FIGS. 11A-C are diagrams illustrating a perspective view and a cross-section of a payload and bus integration system, according to an embodiment of the present invention.
Figure 11B:
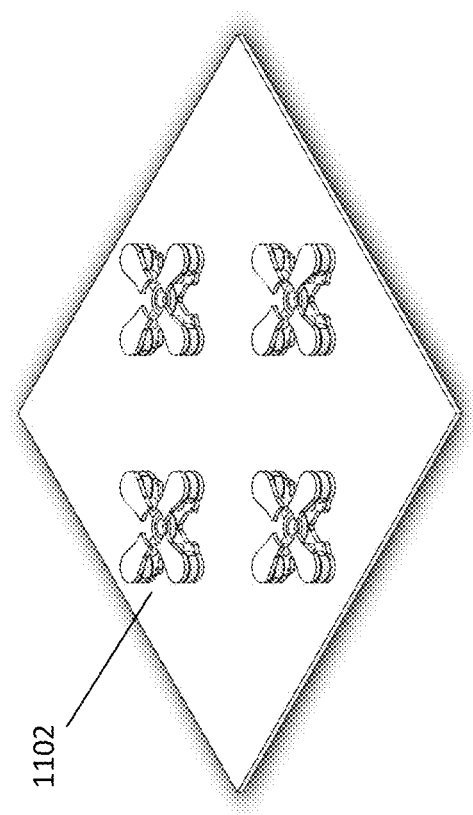
Figure 11C:
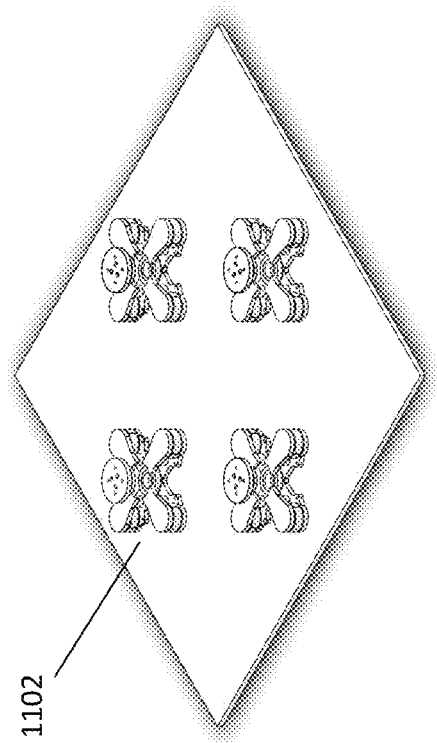

FIGS. 11A-C are diagrams illustrating a perspective view and a cross-section of a payload and bus integration system 1100, according to an embodiment of the present invention. In an embodiment, payload and bus integration system 1100 includes a plurality of kinematic devices (or "devices") 1102 arranged in a pattern to support expected on-orbit maneuver loads. Each device 1102 support loads in a certain direction based on the choice of complementary surface. For example, each device 1102 includes complementary kinematic surfaces (the "cup-cone") that provides the mechanical connection integrated with an electro-permanent magnet, which provides the clamping and restraining force. This cup-cone configuration serves as a physical and mechanical interface between two surfaces 1104 and 1106. In some embodiments, surface 1104 may be an attachment panel of a payload and surface 1106 may be an attachment panel of a spacecraft bus. The arrangement of devices on the bus and payload, thus, allowing for attachment and detachment on-orbit. While attached, devices 1100 act as a mechanical connection, which provides alignment and allows loads to pass between the bus and payload.

Because device 1102 is separated in two parts, i.e., a cup part and a cone part, physical and mechanical connections can be achieved between two separate bodies. Further, each device 1102 provides a controlled kinematic contact between the two separate bodies. Additionally, by utilizing multiple devices arranged in a predefined pattern, a standard interface is provided that supports loads, provides alignment, and allows on-orbit assembly between separate bodies as part of a modular spacecraft.

Payload and bus integration system 1100 may allow for a high preload state for operation and low or zero preload state for assembly and disassembly. The EPM has an "ON" state and an "OFF" state. In the "ON" state, the magnetic flux is directed through the separable parts and through the air gap. The large flux crossing the air gap produces a high force, providing the high preload state. In the "off" state, the magnetic flux is directed away from the air gap, with only a small residual amount of flux across the air gap producing a very small force, providing the low or zero preload state. The low preload state produces a force low enough to allow for safe attachment and detachment of the device on-orbit by a robotic assistant. The high preload state ensures engagement of the contacting surfaces which provides the mechanical connection during operation.

Payload and bus integration system 1100 does not require human interaction for connection or disconnection of the two separate bodies, and does not require any moving parts.

Some embodiments are designed to preclude taper locking by choice of contact angle. It should be noted that taper locking occurs when the tangential forces due to friction (friction coefficient times normal force) are greater than the preload pushing the tapered surfaces together. The normal force is a function of the preload and the taper angle. The friction coefficient is dependent on the materials and the surface conditions. The friction coefficient is limited in practice to a range of values seen in nature. The taper angle (here called the contact angle) can be chosen by the designer to limit the normal force produced by the preload, and thereby, preclude taper locking given the known range of friction coefficient seen in nature.

Some embodiments may be designed to preclude galling by choice of materials, coatings, and lubricant. For instance, galling is a severe condition of high friction and wear between contacting bodies due to adhesion between the contacting surfaces, which is generally to be avoided. Galling is affected by the materials, loading, motion, surface conditions, present of lubricant, and other environmental factors. For devices that provide low friction, separability and long life, galling can be avoided by judicious choice of material, coatings and lubrication. Test data exists that provide galling threshold loads for various material combinations. The cup and cone materials are selected to provide a high galling threshold. Surface treatments, coatings, or lubricants can also be included to further separate the contacting substrates and chemically discourage adhesion.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A payload-bus kinematic interface system, comprising:
   one or more reusable kinematic devices, each of which comprise a first internal contacting surface and a second internal contacting surface, wherein
   the first internal contacting surface kinematically interfaces with the second internal contacting surface, passing loads or forces to the second internal contacting surface; and
   one or more electropermanent magnets (EPMs) is associated with each of the one or more of kinematic devices.

2. The payload-bus kinematic interface system of claim 1, wherein each of the one or more EPMs are configured to provide a clamping force during an ON state,
   the clamping force connects the first internal contacting surface with the second internal contacting surface.

3. The payload-bus kinematic interface system of claim 1, wherein the first internal contacting surface comprises a cone-shaped interface sphere configured to interface with a cup-shaped receiving portion of the second contacting point.

4. The payload-bus kinematic interface system of claim 1, wherein the second internal contacting surface comprises a cup-shaped receiving portion configured to interface with a cone-shaped interface sphere of the first contacting surface.

5. The payload-bus kinematic interface system of claim 4, wherein the cup-shaped receiving portion comprises a bevel configured to aid with initial alignment of the first contacting surface.

6. The payload-bus kinematic interface system of claim 4, wherein the cup-shaped receiving portion further comprises a lateral slipping support configured to support lateral loads when the lateral loads exceed a capability of a preloaded first and second surface.

7. The payload-bus kinematic interface system of claim 1, further comprising:
   a first complementary contacting surface comprises a plurality of mounting features, each of which are configured to assemble the first complementary contacting surface onto an adjacent structure.

8. The payload-bus kinematic interface system of claim 1, further comprising:
   a second complementary contacting surface comprises a plurality of mounting features, each of which are configured to assemble the second complementary contacting surface onto an adjacent structure.

9. The payload-bus kinematic interface system of claim 1, wherein the first internal contacting surface and second internal contacting surface are configured to provide a mechanical connection between two separate adjacent structures when the first internal contacting surface and the second internal contacting surface interface with one another.

10. The system of claim 1, further comprising:
a first set of thermal insulative washers attached to a first complementary contacting surface; and
a second set of thermal insulative washers attached to first complementary contacting surface, wherein
the first set of thermal insulative washers and the second set of thermal insulative washers are configured to decrease thermal conductance.

11. A system configured to provide an interface between a first device and a second device, the system comprising:
a plurality of kinematic devices arranged in a pattern to support expected on-orbit maneuver loads; and
one or more electropermanent magnets (EPMs) surrounding each of the plurality of kinematic devices, wherein
each of the plurality of kinematic devices comprises a first complementary surface attached to a first adjacent surface of the first device and a second complementary surface attached to a second adjacent surface of the second device, and
the first complementary surface and the second complementary surface are configured to provide a mechanical connection integrated with the one or more EPMs.

12. The system of claim 11, wherein the one or more EPMs is configured to provide the clamping and restraining force.

13. The system of claim 11, wherein the first adjacent surface is an attachment panel of the first device or an attachment panel of the second device.

14. The system of claim 11, wherein the second adjacent surface is an attachment panel of the first device or an attachment panel of the second device.

15. The system of claim 11, wherein the first complementary surface and the second complementary surface are configured to pass loads between the first device and second device.

16. The system of claim 11, wherein the first complementary surface and the second complementary surface are configured to provide alignment and precision positioning between the first device and second device.

17. A payload-bus kinematic interface system, comprising:
one or more kinematic devices arranged in a pattern between a payload and a bus, each of which comprise a first contacting surface, a second contacting surface, and a plurality of electropermanent magnets (EPMs) surrounding the first contacting surface and the second contacting surface, wherein
each of the plurality of EPMs apply a magnetically induced preload, the magnetically induced preload with the first contacting surface and the second contacting surface constrain up to 6 degrees of freedom (DOF).

18. The payload-bus kinematic interface system of claim 17, wherein the magnetically induced preload constrains an insertion axis.

19. The payload-bus kinematic interface system of claim 17, wherein the first contacting surface kinematically interfaces with the second contacting surface, passing loads or forces to the second contacting surface or vice versa.

20. The payload-bus kinematic interface system of claim 17, wherein the first complementary surface and the second complementary surface are configured to provide alignment and precision positioning between the payload and bus.

* * * * *